Feb. 3, 1959  P. J. SPETH  2,872,604
DYNAMOELECTRIC MACHINE STRUCTURE
Filed March 12, 1954  3 Sheets-Sheet 1
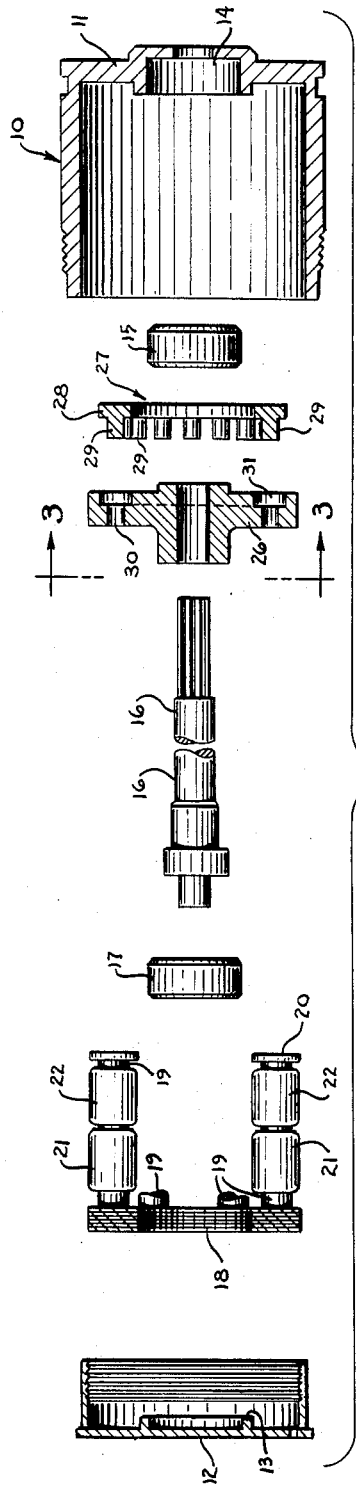
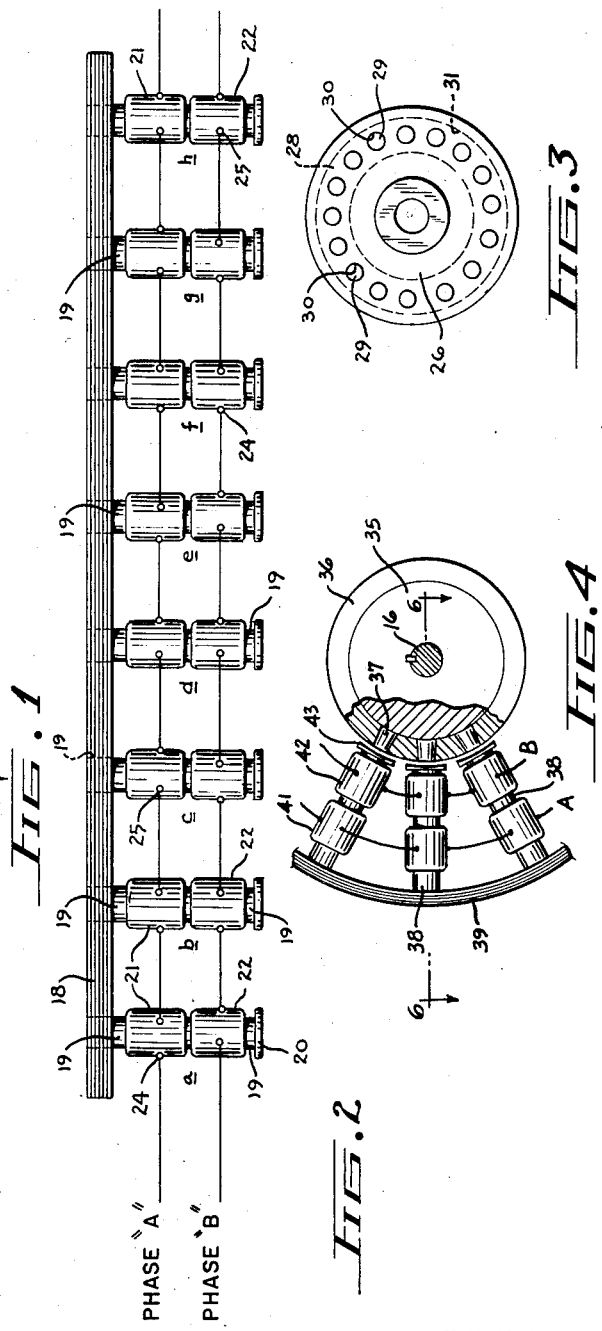
INVENTOR.
PETER J. SPETH
BY
Bauer and Seymour
ATTORNEYS Feb. 3, 1959 P. J. SPETH 2,872,604
DYNAMOELECTRIC MACHINE STRUCTURE
Filed March 12, 1954 3 Sheets-Sheet 2
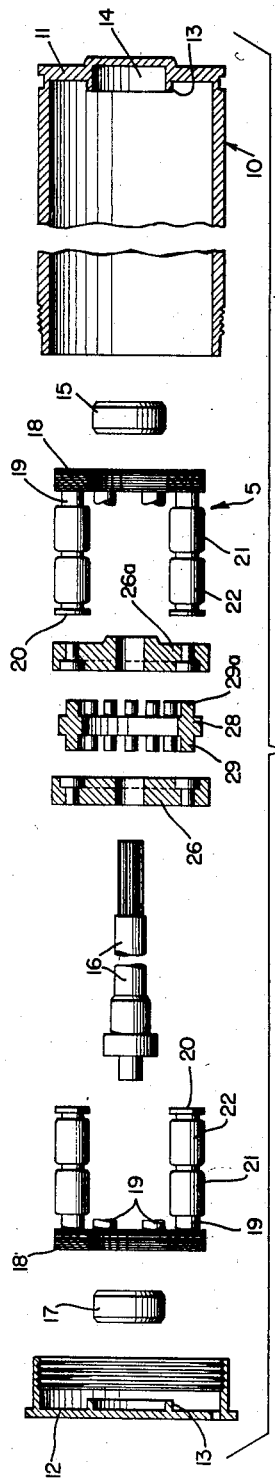
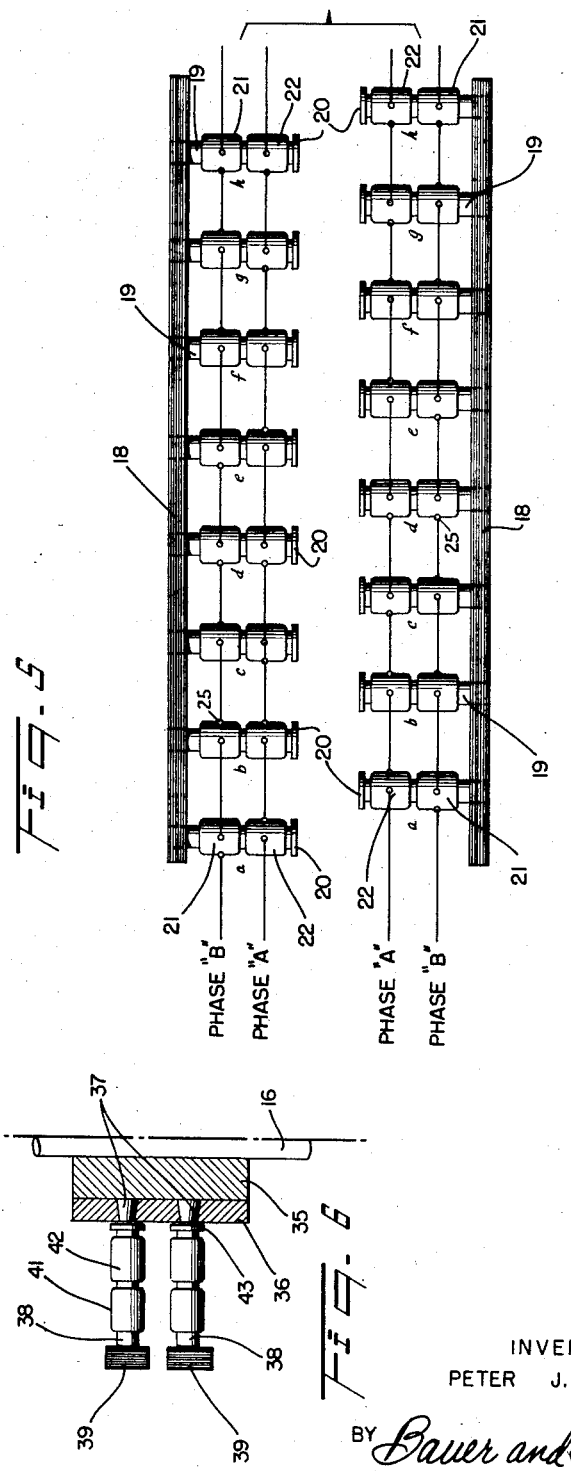
INVENTOR
PETER J. SPETH
BY Bauer and Seymour
ATTORNEYS Feb. 3, 1959  P. J. SPETH  2,872,604
DYNAMOELECTRIC MACHINE STRUCTURE
Filed March 12, 1954  3 Sheets-Sheet 3
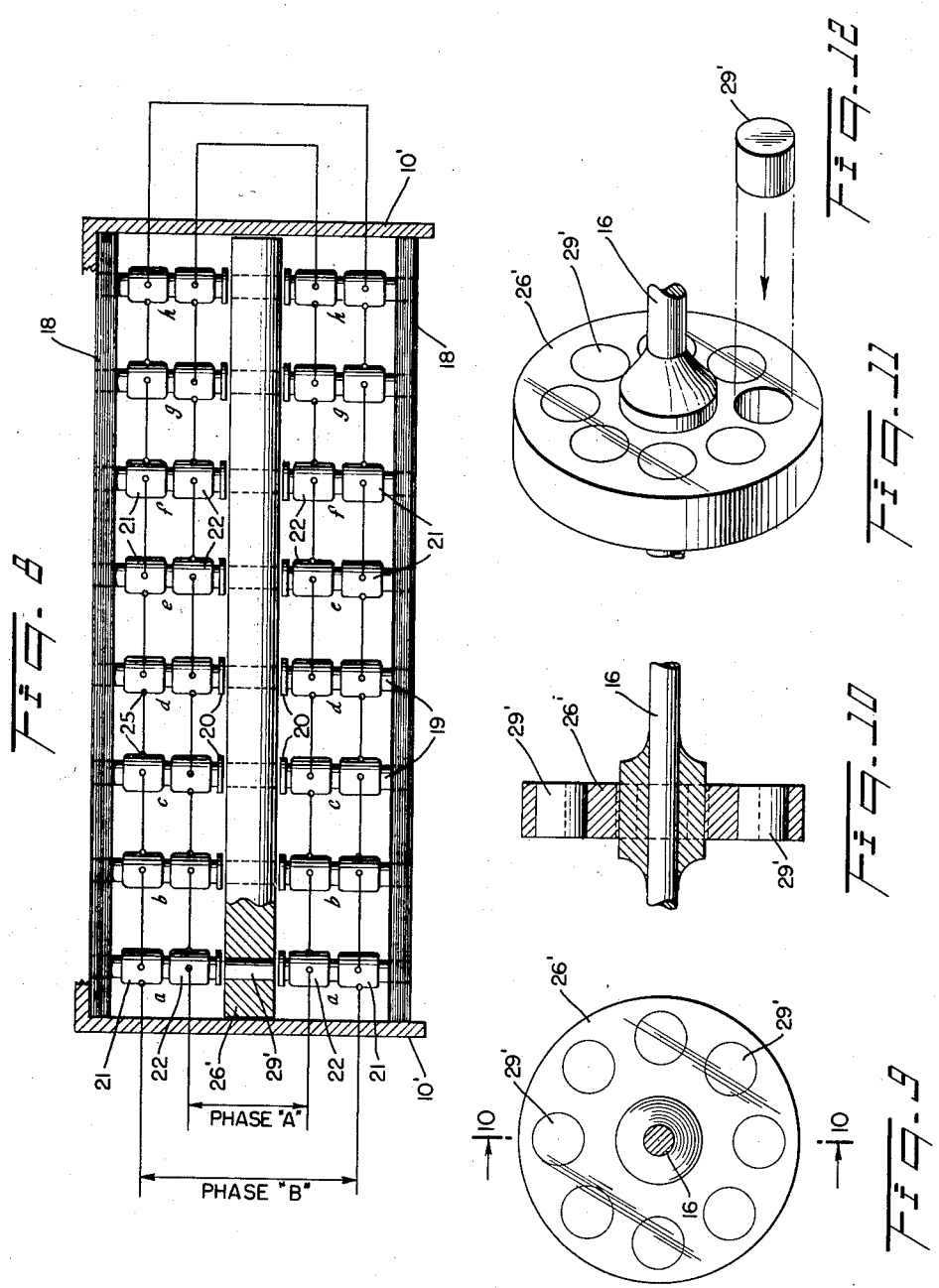
INVENTOR
PETER J. SPETH
BY Bauer and Seymour
ATTORNEYS

United States Patent Office 2,872,604
Patented Feb. 3, 1959

2,872,604

DYNAMOELECTRIC MACHINE STRUCTURE

Peter J. Speth, Bellerose, N. Y.

Application March 12, 1954, Serial No. 415,731

9 Claims. (Cl. 310—166)

This invention relates to electrical apparatus and, more particularly, to electrically driven motors of the alternating current type.

One of the objects of the present invention is to provide a novelly constructed alternating current motor.

Another object of the invention is to provide an electrical motor of the above type which is of small size in comparison to prior known structures of comparable capabilities and which may be readily reversed.

Still another object is to provide a motor which is of simplified construction that may be readily manufactured at reduced cost, and with increased production speed.

A further object is to provide an alternating current motor which operates in a novel manner with increased efficiency.

A still further object is to provide an electrical motor which is so constructed as to assure increased operating life with greater safety and durability than can be expected from prior known motors of comparable capabilities.

Another object is to provide a novel alternating current motor wherein the leverage of the magnetic forces acting to turn the rotor is greater than in present motors of the same size, and wherein the coils that create the magnetic field may be simply wound to give greater operating efficiency.

Another object is to provide an electrical motor which is so constructed as to make advantageous use of materials which are not adapted for use in motors in present commercial use.

Still another object is to provide a simplified, novelly constructed rotor for electrical motors.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is an exploded side elevation view showing one typical motor construction which embodies the invention, some of the parts being shown in section and some of the stator poles being omitted in the interest of clarity;

Fig. 2 is a developed view of the stator in the motor of Fig. 1;

Fig. 3 is an end view of the rotor of said motor, the view being taken from the left as indicated by the lines 3—3 of Fig. 1;

Fig. 4 is an end elevation view, partly in section and with parts broken away, showing a modification of the invention;

Fig. 5 is a view similar to Fig. 1 showing dual electrical and magnetic systems in a single motor;

Fig. 6 is a detail sectional view taken on line 6—6 of Fig. 4 illustrating dual electrical and magnetic systems in a radial air gap modification of the invention;

Fig. 7 is a developed view of the stators of a dual motor of the type shown in Fig. 5, but with one stator circumferentially offset from the other;

Fig. 8 is a developed view of the dual stator construction of Fig. 5 in combination with a modified rotor;

Fig. 9 is an end elevation of the rotor of Fig. 8;

Fig. 10 is a sectional view taken on line 10—10 of Fig. 9;

Fig. 11 is an isometric view of the rotor of Fig. 10; and,

Fig. 12 is an isometric view of a pole member of the rotor of Fig. 11.

The several embodiments of the invention shown by way of example in the drawings are of such form as to permit use thereof in constructing motors of a variety of sizes, but are particularly adapted for small, high-speed motors energized by relatively high frequency alternating current. These motors are particularly adapted for use in aircraft installations which are presently usually equipped with a 400 cycle alternating current source. A multiphase current supply is required, and the illustrated structure operates on a two phase supply, designated in the drawing as phase A and phase B. The multiphase current may be obtained in any manner known to the art such as by providing a condenser or inductance in one of two parallel circuits from a common source of electrical energy.

One construction which has proved very successful comprises a housing or casing (Fig. 1) consisting of a cylindrical body 10 closed at one end by a wall 11 and a cover 12 threadedly engaging the body to close the other end thereof. The end wall 11 is recessed at 14 to receive a roller bearing 15, the inner race of which receives and rotatably supports one end of a shaft 16. The other end of the shaft is supported for reasonably frictionless rotation by a roller bearing 17 which is in turn supported in a recess formed by a circular rib or flange 13 on the inner surface of cover 12.

The bearing 17 has a close sliding fit in the flange 13 to thereby center the shaft and align the bearings 15, 17.

A ring 18 has a sliding fit on the outer surface of flange 13 and preferably constitutes a part of the stator of the motor. Said ring is, accordingly, preferably laminated from rings of material having high magnetic permeability, such as silicon steel, Permalloy, or other similar metals and alloys which are adapted to conduct magnetic flux with low loss at high frequencies. If desired, element 18 may be in the form of a disc having a slide fit in casing 10 and recessed similarly to cover 12 to receive bearing 17. Projecting axially from one side of ring 18 and circularly arranged thereon are a plurality of coil cores or poles 19 which may be either solid or laminated. Although only two complete poles 19 are shown in Fig. 1, the illustrated motor includes eight equally spaced poles as seen in Fig. 2. The poles 19 may have the ends thereof fitted into openings or recesses in ring or disc 18 or, if desired, these parts may be integrally formed. The outer or free ends of poles 19 may be, and preferably are, somewhat enlarged as at 20 to provide pole shoes.

In the illustrated embodiment which utilizes a dual phase current supply, two sets of simply wound coils 21 and 22 are wound on poles 19. The coils of each pair on the same core are preferably wound in end-to-end relation to simplify the construction and to obtain highest efficiency by having the coil turns as near as possible to the core. For convenience of description, the pairs of coils are also identified by letters *a* to *h*, and specific coils will hereinafter be referred to as coils 21*a*, 22*a*, etc. In the form shown, the coils 21 of one set are connected in series to phase A, but the connections are reversed on successive groups of two coils to effect a different magnetic polarity in the cores or poles 19 on which the same are wound. As shown, the input to each of the coils 21*a*, 21b, 21e and 21f is through the outside turn thereof as indicated at 24, and the input to each of the coils 21c, 21d, 21g, and 21h is through the inside turn thereof as indicated by the connection 25. Thus, coils 21a and 21c, for example, are in effect oppositely or reversely wound so that at a given instant the tendency of coil 21a and the similarly wound coils is to create a flow of magnetic flux in their cores 19 in one direction relative to ring 18 and the coil 21c and the other similarly wound coils create a flow of magnetic flux in their cores in the opposite direction relative to ring 18.

The coils 22 of the other set are connected in series to phase B and, similarly to the coils 21, the same are connected in successive groups of two, the coils of alternate groups having the input of current through the outside windings thereof, and the others having the input through the inside turns thereof. However, the groups of two of coils 21 in one set and the similarly connected groups of two of coils 22 in the other set are circumferentially offset with respect to each other a distance equal to the spacing of the axes of cores 19. Thus, the input to coils 22b, 22c, 22f, and 22g is through their outside turns, and the input to coils 22a, 22d, 22e, and 22h is through the inside turns thereof. It will be understood that in the actual construction, coils 22a and 22h are adjacent and constitute a group of coils as this term has been used herein. Thus, alternate pairs of coils a, c, e, and g have coils 21 and 22 thereof oppositely connected in their respective circuits and the coils 21 and 22 of the remaining pairs b, d, f, and h are similarly connected in their respective circuits. The coils 21 are preferably all of the same construction as are also the coils 22, but the coils of one set may vary in construction from the coils of the other set. This is particularly true and may in fact be desirable where phases A and B are connected to different sources of power or energy. For example, one phase may be connected to a generator while the other phase is connected to a different source which may in turn be controlled by an indicator, such as a liquid level indicator. Although the coils of each set are illustrated as being connected in series, it will be clear to those skilled in the art that the same fundamental result may be obtained by connecting the coils in parallel or by connecting some in series and others in parallel.

Mounted on shaft 16 for rotation therewith is a novelly constructed rotor comprising a body member 26 and a pole member 27. The latter, as shown, consists of a ring portion 28 from which project a plurality of poles 29, and is made of a material having high magnetic permeability, such as silicon steel, Permalloy, or the like. Losses in pole member 27, particularly at high frequencies, may be reduced to a minimum by molding said member from such materials as ground silicon steel and a suitable binder. The use of such materials which greatly improve operating efficiency is not practical in presently known rotor constructions for electrical motors.

Rotor body member 26 is provided with circumferentially arranged transverse openings 30 to receive poles 29 and an annular recess 31 for receiving ring portion 28 of member 27. Members 26 and 27 may be tightly secured together in any suitable manner and, if desired, member 27 may be initially molded into openings 30 and recess 31. The number of rotor poles 29 may be equal to the number of stator poles 19, 20, but in the illustrated embodiment, the number of rotor poles is double the number of stator poles to provide a greater starting torque to initiate rotation of the rotor and shaft.

Rotor body member 26 is made of a suitable metal, preferably a light weight metal, which is non-magnetic, but electrically conductive. Some suitable metals for this purpose are copper, Duralumin, silver, and the like. It will thus be seen that the portion of body member 26 which immediately surrounds each pole 29 constitutes a single, short-circuited turn of current conducting material around that pole. When magnetic flux is directed through a pole 29 in a manner to hereinafter appear, current will be induced in said turn around the same, the direction of flow of which will depend on the direction of the magnetic flux, as is well understood in the art. The current thus induced will tend to resist and hence delay any reversal of the magnetic flux in and, hence, the polarity of such pole.

When the above described parts are assembled within housing 10, 12, the pole faces 20 will be spaced by a small air gap from the left or outer end faces of poles 29. The latter and poles 19, 20 will thus be magnetically connected when current flows through coils 21 and 22 to cause a flow of magnetic flux in cores 19. The direction of flow and the magnitude of the flux in each core 19 will be dependent upon whether the magnitude of the current is rising or falling in the surrounding pair of coils 21, 22 and further upon the phase relationship of the current flowing in said pair of coils. The magnetic polarity of each pole 19 passes through a complete cycle of reversal during each cycle of current through the coils. The magnetic flux path through adjacent poles 19 of opposite polarity is closed at one end through ring 18 and completed at the other end through rotor poles 29 and ring 28.

Normally, each rotor pole 29 assumes a magnetic polarity which is the same as the polarity of an opposed stator pole 19 in which the generated magnetic flux has the same direction of flow. There is a reversal of flux in each pole 19 and hence a reversal of polarity during each rise and fall of the alternating current in the surrounding pair of coils. A corresponding reversal in the associated or opposed rotor poles 29 is delayed, as pointed out above, by the counteracting effect of the currents induced in the short circuited turns formed in rotor body 26 around each pole 29. Accordingly, when such a reversal occurs, any selected pole 19, 20 momentarily assumes a polarity opposite to that of the opposed rotor pole 29, and hence repels the latter. At the same time, the polarity of an adjacent stator pole reverses, thereby assuming the same polarity as the last-mentioned pole 29, and attracts the same. This simultaneous repulsion and attraction of each rotor pole 29 during successive reversals of polarity in the stator poles 19, 20 effects rotation of the rotor 26, 27 at a speed which is dependent upon the number of poles and the frequency of the alternating current supply.

The order of the flux reversals in adjacent successive cores 19 is determined by the manner in which coils of the two sets 21 and 22 are connected and by the phase relationship of the current passing through the two sets of coils. For example, the construction may be such that if phase A leads phase B, the rotation of rotor 26, 27 and hence shaft 16 will be in one direction, whereas, if phase B leads phase A, rotation will be in the opposite direction. Thus, to change the direction of rotation or angular movement of the rotor, it is only necessary to suitably shift the phase relationship of the current supplied to the coils 21 and 22.

It will be readily apparent that the rotor and stator poles need not form a complete circle so that the invention may be readily adapted to a phase operated relay. The rotor, which need be only a segment of a circle, could be magnetically actuated by a segmental stator to either of two limiting positions by a suitable change in the phase relationship of the energy supplied to the two sets of coils. It will be seen also that the electrical and magnetic system above described may be duplicated in a single motor, preferably by placing a second reversely positioned stator S (Fig. 5) on the other side of the rotor and extending the rotor poles 29' from face to face of electrically conductive, non-magnetic body 26', as in Figs. 8 to 11, without any connecting ring 28 or providing, as in Fig. 5, another set of poles 29a on the opposite face of ring 28 in an electrically conductive disc 26a comparable to or integral with body 26. If ring 28 is eliminated, it might then be desirable to provide an external magnetic flux path between the rings or discs 18 of the two stators, such as through a surrounding casing 10' (Fig. 8).

Another embodiment or modification of the invention is illustrated in Fig. 4. The rotor on shaft 16 comprises a disc 35 of magnetic flux conducting material surrounded by a ring 36 of a material having good electrical conductivity. Ring 36 corresponds with rotor body 26 of Fig. 1 and disc 35 which may be laminated corresponds with ring 28. Conductive ring 36 is radially drilled at equally spaced intervals to receive magnetic flux conducting poles 37, the inner ends of which make good contact with or may extend into recesses in disc 35. The outer ends or faces of poles 37 are preferably flush with the outer periphery of ring 36. Poles 37 may consist of molded powdered material and a binder, laminated sheets, bundles of wires or the like.

The stator surrounds rotor 35, 36 and comprises a plurality of radially extending cores 38 connected at the outer ends thereof by a ring 39 of magnetic flux conducting material in the same manner and for the same purpose that ring 18 connects cores 19. Pairs of coils 41 and 42 are mounted on cores 38 and are electrically connected in the same manner as coils 21 and 22. The inner ends of cores 38 are preferably provided with pole shoes 43 which extend into air gap relation with rotor 35, 36 for cooperation with poles 37. The operation of the embodiment of Fig. 4 is the same as that described above for the embodiment of Figs. 1 to 3.

There is thus provided a novel and highly efficient alternating current electrical motor which functions in accordance with a novel mode of operation. The novel, simplified construction of the motor makes possible high speed fabrication at low cost and the sturdiness, especially of the rotating parts, insures long life and safe operation at high speeds. In relation to known motors of comparable size, the motor contemplated by the present invention utilizes shorter lengths of wire per ampere turn in the stator coils, and thereby produces greater magnetic effect with less heating and higher efficiency. The novel construction is also advantageous in that it makes possible the practical integration of magnetic coils on either or both sides of a rotor in multiphase motors, and makes possible the utilization of a larger number of poles in a motor of given size to thereby attain lower rotor speeds with increased torque. The novel rotor construction embodied in the motor makes possible the use of highly efficient magnetizable materials for the flux conducting portions, as well as a reduction in the number of parts required, while reducing the cost of manufacture and increasing the durability at high rotary speeds.

In electrical motors heretofore known, the magnetizable material contained in the rotor is used to support the wire coil or coils or the bars and end rings as in squirrel cage constructions. This type of construction necessitates intricate designs of rotor cores which are difficult and expensive to manufacture. In applicant's novel construction, one of the basic ideas which prevails is that when a hole or recess is drilled in an electrically conductive but non-magnetic material, a coil consisting of one short-circuited turn is provided and when the hole or recess is filled with a magnetically influenced substance, an electromagnet type of construction is produced in which current can be induced in the short-circuited turn by induction, such as in a transformer. In view of this, it becomes feasible in accordance with applicant's invention to provide a rotor disc of material having high electrical conductivity and of suitable diameter and thickness to permit the drilling of circumferentially spaced holes or recesses which, when filled with magnetic flux conducting material, will admirably fulfill the design requirements for induction motor construction.

Although only a limited number of modifications or embodiments of the invention have been illustrated in the drawings and described in the foregoing specification, it is to be expressly understood that the invention is not limited thereto. For example, it will be clear that poles 29 and cores 19 need not be cylindrical or round in transverse section, as illustrated, but may be of other suitable shapes, such as rectangular, star, oval, conical or the like. Additionally, there may be provided more than two sets of coils which are supplied with two-phase alternating current. There may, for example, be three sets of coils supplied with three-phase current, and the number of poles and cores may be larger or smaller than the numbers shown in the drawings. If as described above, a stator is provided at each side or end of the rotor 26, 27 and the rotor poles extend from face to face of the rotor body (Fig. 8), a single set of stator coils may be utilized on each stator, i. e., the coils 21 of one set could be mounted on the cores of one stator at one end of the rotor, and the coils 22 making up the other set could be mounted on the other stator at the opposite end of the rotor. Similarly, adjacent sets of stator cores 38 with single coils thereon could be provided to cooperate with adjacent circles or rings of rotor poles 37, the coils on different stators being supplied with different phase current. Also, a plurality of rotors of the various types shown and hereinabove described may be mounted or combined on a single shaft in operative relation to cooperating stators and the corresponding poles 29 (or 37) of different rotors may be either in axial alignment or circumferentially offset relative to each other in any desired pattern. With the type of rotor shown in Fig. 4, a plurality of axially spaced sets or circles of poles 37 may be provided in a single rotor structure embodying a single ring 36 and a single core or connecting member 35, as shown in Fig. 6. In a motor embodying multiple rotor construction, the cores of the coils on adjacent or different stators which cooperate with the rotors may be angularly or circumferentially offset relative to each other if desired, as illustrated in Fig. 7. It will also be apparent that a single rotor may have one or more concentric circles of poles 29 adapted for cooperation with concentric circles of stator poles 19, 20. Various other changes may also be made in the illustrated embodiments, such as in the design and arrangement of parts thereof, without departing from the spirit and scope of the invention as the same will now be understood by those skilled in the art.

What is claimed is:

1. In an electric motor, a rotor comprising a shaft, means rotatably supporting said shaft and means rotatable with said shaft including a unitary, one-piece member of non-magnetic material having good electrical conductivity, a plurality of circumferentially spaced poles in and supported by said member, whereby said member forms a single short-circuited turn around each of said poles and means connecting one set of corresponding ends of said poles, said poles and connecting means therefor being of magnetic flux conducting material, and a stator mounted for operative cooperation with said rotor comprising a plurality of circumferentially arranged coil cores, means connecting one set of ends of said cores, said cores and end connecting means therefor being of magnetic flux conducting material, at least two sets of coils, one coil of each set being wound on each of said cores, and means for supplying alternating current electrical energy to each of said sets of coils, the latter being so wound in relation to each other and the energy supplied to one set being out of phase with the energy supplied to the other set so that the magnetic polarity of each said core is cyclically reversed and the magnetic flux cycle in each core is out of phase with the magnetic flux cycle in the cores adjacent thereto.

2. An electric motor as defined in claim 1 wherein one half of the coils of each set are wound in one direction and the other half are wound in the opposite direction, whereby the cores of said one half of the coils are magnetized oppositely to the cores of the coils of said other half thereof in response to the flow of alternating current in said coils, and the coils of said one half being alternately mounted with the coils of said other half.

3. In an electric motor, a rotor comprising a shaft, means rotatably supporting said shaft and means rotatable with said shaft including a member of non-magnetic material having good electrical conductivity, a plurality of circumferentially spaced poles in said member, whereby said member forms a single short-circuited turn around each of said poles and means connecting one set of corresponding ends of said poles, said poles and connecting means therefor being of magnetic flux conducting material, and a stator mounted for operative cooperation with said rotor comprising a plurality of circumferentially arranged coil cores, means connecting one set of ends of said cores, said cores and end connecting means therefor being of magnetic flux conducting material, at least two sets of coils, one coil of each set being wound on each of said cores, and means for supplying alternating current electrical energy to each of said sets of coils, the energy supplied to one set being out of phase with the energy supplied to the other set and groups of adjacent coils in each set thereof being wound in one direction and alternate groups of coils in each of said sets being wound in the opposite direction.

4. An electric motor as defined in claim 3 wherein the groups of coils in one set are circumferentially offset from correspondingly wound groups of coils in the other set by an angular distance which is a multiple of the angular distance between the axes of adjacent coil cores.

5. An electric motor as defined in claim 3 wherein each of said groups of coils comprises two coils.

6. An electric motor as defined in claim 5 wherein the groups of coils in one set are circumferentially offset from correspondingly wound groups of coils in the other set an angular distance equal to the angular distance between the axes of adjacent coil cores.

7. In an electric motor, a rotor comprising a member of non-magnetic material having good electrical conductivity, a plurality of circumferentially spaced poles of magnetic flux conducting material supported by said member, whereby said member forms a single short-circuited turn around each of said poles, and a stator at each end of said rotor mounted for operative cooperation therewith, each stator comprising a plurality of circumferentially arranged coil cores, means connecting the ends of the cores of each stator which are remote from the rotor, said cores and end connecting means therefor being of magnetic flux conducting material, at least one set of coils including one coil for each core wound on the cores of each of said stators, the coils of each set being connected in circuit with each other, and means for supplying alternating current electrical energy to each of said sets of coils, the latter being so wound in relation to each other and the energy supplied to the coils of one set being out of phase with the energy supplied to the coils of another set so that the magnetic polarity of each said core is cyclically reversed and the magnetic flux cycle in each core is out of phase with the magnetic flux cycle in the cores adjacent thereto.

8. An electric motor as defined in claim 7 wherein at least two sets of coils are wound on the cores of at least one of said stators, one coil of each of said two sets being wound on each of the cores of said one stator and electrically connected to said current supplying means, the energy supplied to the coils of one of said two sets being out of phase with the energy supplied to the coils of the other of said two sets.

9. In electro-magnetic apparatus, such as an electric motor, a stator comprising a plurality of circumferentially arranged coil cores, means connecting one end of each of said cores to the corresponding ends of the other of said core, said cores and said connecting means therefor being of magnetic flux conducting material, at least two sets of coils, one coil of each set being wound on each of said cores, and means for supplying alternating current electrical energy to said sets of coils, whereby the energy supplied to one set may be out of phase with the energy supplied to the other set, said coils being so wound in relation to each other that the magnetic polarity of each said core is cyclically reversed and the magnetic flux cycle in each core is out of phase with the magnetic flux cycle in the cores adjacent thereto.

References Cited in the file of this patent

UNITED STATES PATENTS

| | | |
|---|---|---|
| 407,844 | Thomson | July 30, 1889 |
| 964,714 | Utne | July 19, 1910 |
| 1,190,054 | Wiard | July 4, 1916 |
| 1,359,333 | Cowles | Nov. 16, 1920 |
| 1,737,128 | Ross | Nov. 26, 1929 |
| 1,897,184 | Zopp | Feb. 14, 1933 |
| 1,928,872 | Sherwin | Oct. 3, 1933 |
| 1,937,373 | Wolfe | Nov. 28, 1933 |
| 2,020,090 | Weed | Nov. 5, 1935 |
| 2,111,934 | Liner | Mar. 22, 1938 |
| 2,230,878 | Bohli | Feb. 4, 1941 |
| 2,316,960 | Ingersoll | Apr. 20, 1943 |
| 2,387,073 | Horlacher | Oct. 16, 1945 |
| 2,450,982 | O'Brien | Oct. 12, 1948 |
| 2,468,295 | Hush | Apr. 26, 1949 |
| 2,475,776 | Brainard | July 12, 1949 |
| 2,479,589 | Parker | Aug. 23, 1949 |
| 2,490,021 | Aske | Dec. 6, 1949 |
| 2,516,901 | Morrill | Aug. 1, 1950 |
| 2,550,571 | Litman | Apr. 24, 1951 |
| 2,573,283 | Seitz | Oct. 30, 1951 |
| 2,691,124 | Aske | Oct. 5, 1954 |

FOREIGN PATENTS

| | | |
|---|---|---|
| 103,184 | Australia | Feb. 2, 1938 |
| 158,013 | Great Britain | Feb. 3, 1921 |
| 266,799 | Great Britain | Feb. 28, 1927 |
| 501,811 | Belgium | Mar. 31, 1951 |
| 1,039,288 | France | May 13, 1953 |